Dec. 6, 1960 E. S. CORNISH 2,962,906
LEVEL WINDING MECHANISM AND ADJUSTING MEANS THEREFOR
Filed Jan. 24, 1958 2 Sheets-Sheet 1

INVENTOR.
Eugene S. Cornish
BY
Paul E. Mullendore
ATTORNEY

Dec. 6, 1960  E. S. CORNISH  2,962,906
LEVEL WINDING MECHANISM AND ADJUSTING MEANS THEREFOR
Filed Jan. 24, 1958  2 Sheets-Sheet 2

INVENTOR.
Eugene S. Cornish.
BY
Paul E. Mullendore
ATTORNEY

United States Patent Office 2,962,906
Patented Dec. 6, 1960

2,962,906

LEVEL WINDING MECHANISM AND ADJUSTING MEANS THEREFOR

Eugene S. Cornish, Enid, Okla., assignor to George E. Failing Company, Enid, Okla., a corporation of Delaware Filed Jan. 24, 1958, Ser. No. 710,897

3 Claims. (Cl. 74—57)

This invention relates to a level winding mechanism for cable winding devices and includes a cable guide that is reciprocated back and forth across the face of the reel and an adjusting mechanism to effect level winding of the cable thereon.

Guides of this character are usually operated by a shaft traversed by right and left threads in which a follower tracks. It often happens that the follower may not be in proper position on the shaft with respect to turning of the reel, consequently, the guide may not reverse at the proper time and a level wind cannot be attained. When the reel is operating in connection with certain types of equipment, such as, for example, equipment used in making electrical surveys of bore holes in the earth, level winding of the cable is a necessity.

Therefore, the principal object of the invention is to provide level winding devices with means for adjusting the follower with respect to its operating shaft.

Other objects of the invention are to provide means capable of infinite adjustments while the level winding mechanism is in operation, to provide for adjusting the follower from zero to 360 degrees around the level winding shaft; to provide a structure whereby the position of the follower may be set to movement of the cable and rotation of the reel exactly in phase; and to provide a simple construction that is adapted to existing level winding devices.

In accomplishing these and other objects of the invention as hereinafter pointed out, improved structure is provided, the preferred form of which is illustrated in the accompanying drawings, wherein.

Figure 1:
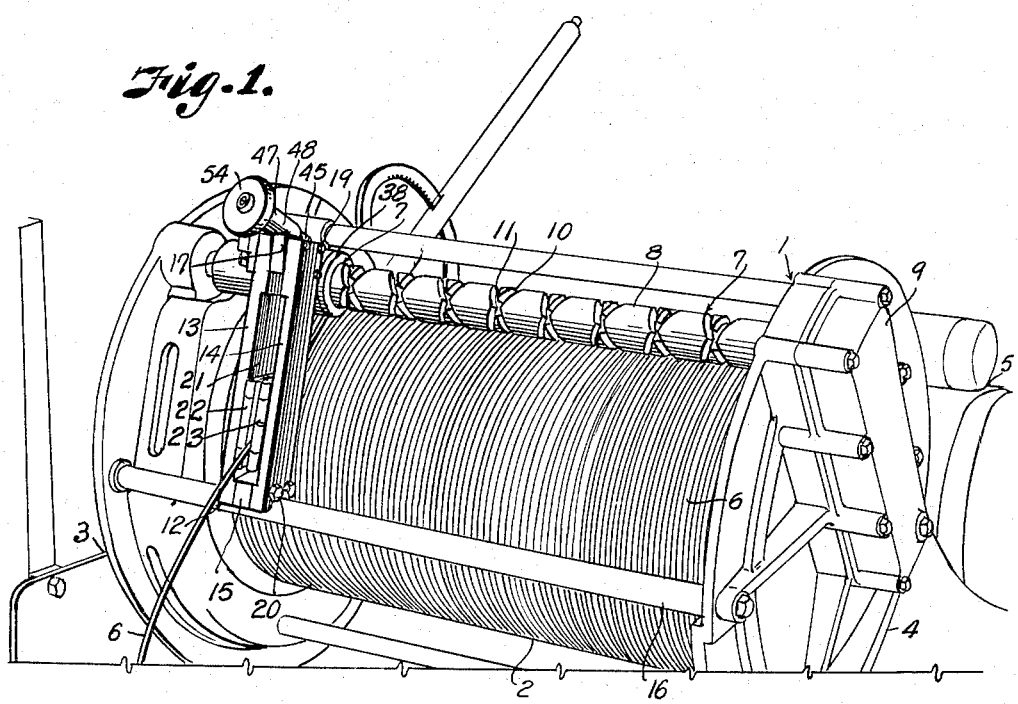
Fig. 1 is a perspective view of a cable winding apparatus equipped with a level winding device and adjusting means constructed in accordance with the present invention.
Figure 2:
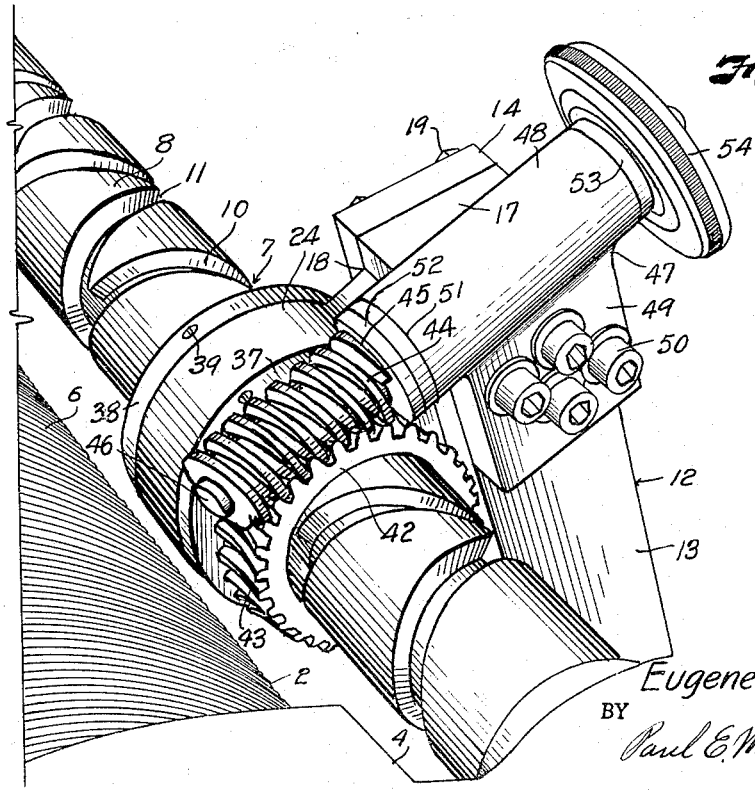
Fig. 2 is an enlarged fragmentary view showing the adjusting means and particularly the worm and worm gear thereof through which the adjustment is effected and the carrier for the follower is automatically locked in adjusted position.

Referring more in detail to the drawings:

1 designates a conventional type of cable winding apparatus including a reel 2 that is suitably mounted between side frames 3 and 4 for rotation under power of a prime mover such as a motor 5, the motor 5 being suitably connected with the reel 2 for operating the reel at desired speeds in either direction for winding up or paying out a cable 6. Such apparatus includes a level winding mechanism 7 extending across the face of the reel 2 to guide the cable across the width of the reel as the cable is wound thereon or unwound therefrom. The level winding device includes a level winding shaft 8 having its ends journaled in the side frames 3 and 4 and driven from the reel by a driving connection, not shown but which is enclosed within the housing 9. The shaft 8 is provided with right and left spiral grooves 10 and 11 for reciprocating a cable guide 12 across the face of the reel for effecting a level winding of the cable 6 on the reel.

The guide 12 includes side bars 13 and 14 that are spaced apart at their lower ends by a block 15 and which is slidable along a guide rod 16 having its ends fixed to the side frames 3 and 4. The upper ends of the side bars 13 and 14 are correspondingly spaced apart by an arm 17 on a carrier or housing 18. The bars are secured to the spacing means 15 and 17 by fastening devices 19 and 20 to provide a vertical way 21 for mounting elongated guide rollers 22 and 23 for engaging the respective sides of the cable 6.

The carrier or housing 18 includes a cylindrical band 24 that is connected with the arm 17 and which encircles the level winding shaft. The inner diameter of the band 24 is larger than the diameter of the shaft to accommodate therebetween a sleeve or carrier 25 for a follower 29. The carrier 25 includes sleeve-like body 26 having a cylindrical exterior face 27 of a size to turn snugly within the band 24 of the housing 18. The carrier 25 has an axial bore 28 for passing the level winding shaft 7 therethrough when the parts are assembled as later described, and wherein the shaft turns freely while the carrier 25 is reciprocated lengthwise of the shaft by means of the follower 29 that engages in one or the other of the spiral grooves 10 and 11, as later described.

Figure 5:
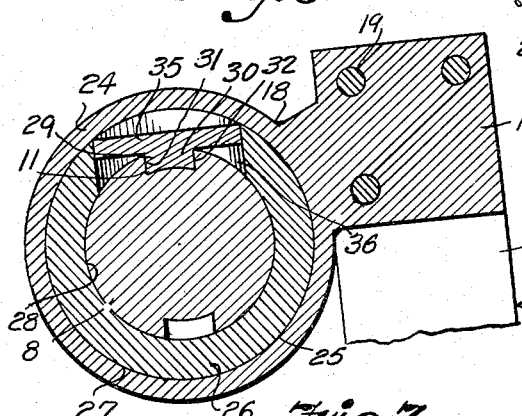
Fig. 5 is a cross sectional view on the line 5—5 of Fig. 3.
Figure 6:
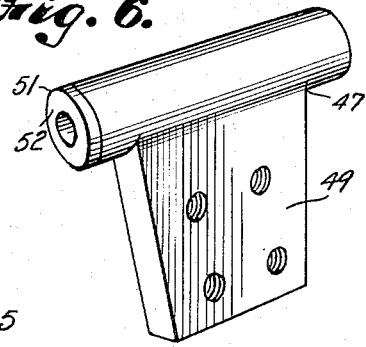
Fig. 6 is a perspective view of the worm shaft supporting bracket.
Figure 7:
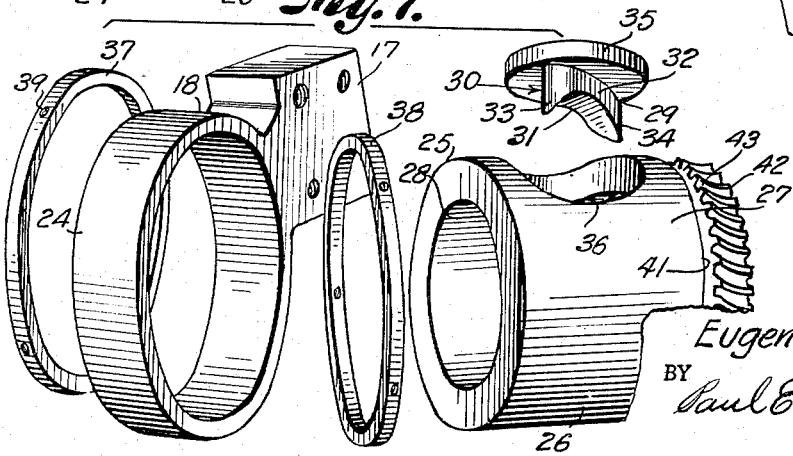
Fig. 7 is a perspective view of the follower, carrier, carrier supporting bracket, and retaining rings, shown in disassembled spaced apart relation.

The follower 29 includes an elongated lug 30 having side faces 31 and 32 that join rounding faces 33 and 34 at the ends of the lug to facilitate transfer and adjustment of the follower from one spiral groove to the other at the respective ends of the reel. The follower 29 also includes a disk shaped head 35 that is oscillatably supported in a radial opening 36 of the sleeve-like body 26 of the carrier 25, the head 35 being engaged by the inner face of the band 24 of the housing 18 to retain the lug portion 30 of the follower 29 in engagement with the spiral grooves of the level winding shaft 8, as best shown in Fig. 5.

The body 26 of the carrier 25 is longer in length than the width of the band portion 24 of the housing 18, so that the ends thereof project from opposite sides of the band a sufficient distance to accommodate thereon retaining rings 37 and 38 which are secured to the carrier 25 by suitable fastening means, such as set screws 39.

Figure 3:
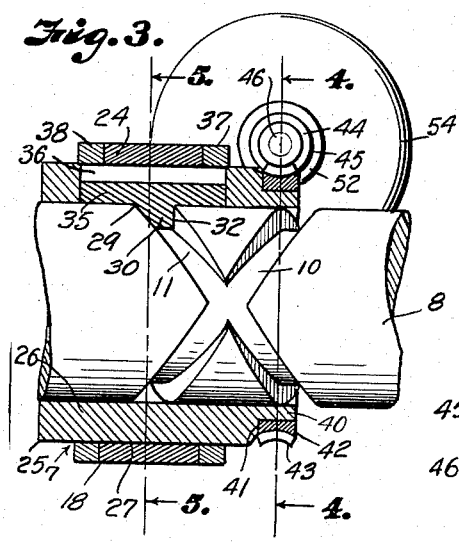
Fig. 3 is a fragmentary view of the level wind shaft and showing the follower and the adjusting mechanism therefor in section.
Figure 4:
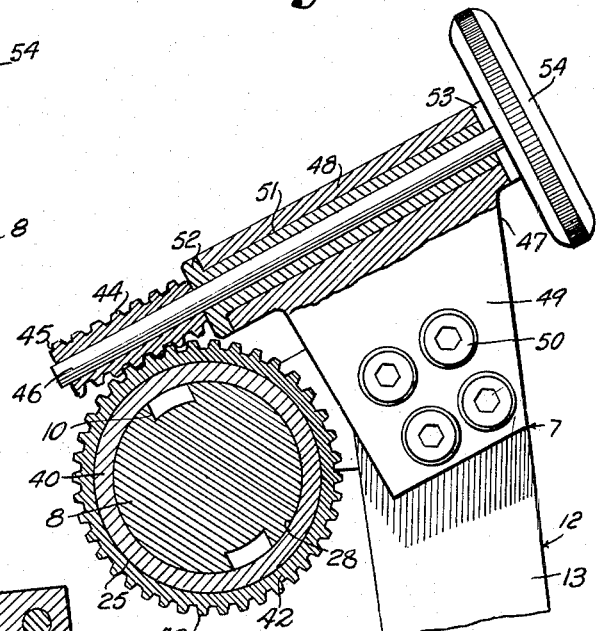
Fig. 4 is a cross sectional view on the line 4—4 of Fig. 3.

In order to adjust the carrier 25 within the carrier housing 18 and to lock the carrier 25 in adjusted position, the body 26 of the carrier 25 has a reduced sleeve-like extension 40 (Fig. 3) which forms a shoulder 41 therewith to mount a worm gear ring 42 having teeth 43 for engaging spiral teeth 44 of a worm 45. The gear ring 42 is pressed upon the extension 40 or otherwise attached thereto for turning the carrier 25 in its housing 18.

The worm 45 is fixed to a shaft 46 that is carried by a bracket 47 fixed to the cable guide 12. The bracket 47 has an elongated sleeve portion 48 and a plate portion 49 that may be integral therewith. The plate portion of the bracket is secured to the upper end of one of the side bars of the guide 12 by fastening devices such as screws 50. The elongated sleeve portion 48 of the bracket is preferably provided with a bushing 51 having a thrust collar 52 at one end for seating the adjacent end of the worm 45 when the shaft 46 is rotatably mounted in the bushing. Mounted on the shaft at the opposite end of the sleeve portion 48 is a thrust washer 53 which is retained in position by a hand wheel 54 that is fixed to the outer end of the shaft 46. The worm 45 is also fixed to the opposite end of the shaft. When the parts are assembled and supported on the guide 11, the spiral teeth 44 of the worm 45 are in meshing relation with the teeth 43 on the worm gear ring 42. The spiral teeth of the worm 45 are of a pitch relatively to the pitch of the gear teeth to hold and support the follower carrier from rotation unless the hand wheel 54 is rotated. However, when the hand wheel 54 is rotated in either direction, the worm 45 is rotated to rotate the worm gear 42 and carrier 25 about the level wind shaft to thereby adjust the follower 25 with respect to the level winding shaft 8.

In assembling the parts, the carrier 25, carrier housing 18 and retaining rings 37 and 38 are sleeved over an end of the level winding shaft 8 prior to mounting of the level winding shaft on the side frames 3 and 4. The level winding shaft 8 may then be mounted in the side frames and the parts brought together, with the carrier 25 being moved to one or the other ends of the shaft. The follower 29 is then passed through the opening 36 of the carrier 25 so that the lug 30 thereof engages in the proper groove with the head 35 thereof being freely oscillatable within the opening. The band portion 24 of the carrier housing 25 is then slid over one end of the carrier 25 and centered over the head 35 of the follower 29, after which the retaining rings 37 and 38 are sleeved over the respective ends of the carrier 25 and brought into contact with the side faces of the band portion 24, after which the set screws 39 are tightened to retain the parts in assembly.

The arm portion 17 of the carrier housing 18 is attached to the cable guide 12 by means of the fastening devices 19. The bushing 51 is pressed into the sleeve portion 48 of the bracket 47 and the worm shaft 46 is passed therethrough with the worm 45 abutting against the thrust collar 52 of the bushing. The thrust washer 53 is then applied to the opposite end of the worm shaft 46 and the hand wheel 54 is attached. The assembly is then brought into position on the guide 12 with the spiral teeth 44 of the worm 45 engaging the teeth 43 of the worm gear ring 42, after which the fastening devices 50 are applied to secure the assembly to the guide. If the guide 12 is not in position to effect a level wind of the cable on the reel, the guide may be easily brought into proper adjustment by turning the hand wheel 54 in a direction to move the carrier 25 and the follower 29 therein until the follower is positioned to effect a level wind of the cable 6 on the reel 2. This adjustment of the follower 25 may be carried out while the reel 2 is in operation. As soon as the adjustment is effected, the hand wheel is released and the engagement between the spiral teeth 44 of the worm 45 and the teeth 43 of the worm gear ring 42 automatically locks the carrier 25 with the follower in adjusted position.

From the foregoing, it is obvious that the invention provides an adjusting means for effecting and maintaining a level winding of a cable on a reel while the reel is in operation and at which time the position of the cable guide can be best adjusted. It is also obvious that an infinite adjustment is provided from zero to 360 degrees around the level winding shaft, so that the movement of the cable guide and the rotation of the reel may be brought exactly into phase.

What I claim and desire to secure by Letters Patent is:

1. In an apparatus which includes a drum for winding a cable thereon, a level winding shaft having right and left grooves, means for rotating the shaft and drum in timed relation, a cable guide carrier on the shaft and carrying a lug engaging alternately the right and left grooves to reciprocate the cable guide carrier along said shaft to lay the cable on the winding drum, and adjusting means for advancing and retarding the lug within one and the other of said grooves to adjust lay of the cable on the drum while the shaft and drum are rotating and cable is being wound upon the winding drum, wherein said adjusting means includes a sleeve journaled in said carrier for oscillatory movement about the axis of the spirally grooved shaft, said sleeve having means for providing a journal in which said lug is adapted to turn from one groove to the other, and means on the carrier and having connection with the sleeve to turn the sleeve in one and the other direction within said carrier and about the axis of the spirally grooved shaft to advance and retard the lug in said grooves for adjusting the lay of the cable on the winding drum simultaneously with winding of the cable thereon.

2. In an apparatus which includes a drum for winding a cable thereon, a level winding shaft having right and left grooves, means for rotating the shaft and drum in timed relation, a cable guide carrier on the shaft and carrying a lug engaging alternately the right and left grooves to reciprocate the cable guide carrier along said shaft to lay the cable on the winding drum, and adjusting means for advancing and retarding the lug within one and the other of said grooves to adjust lay of the cable on the drum while the shaft and drum are rotating and cable is being wound upon the winding drum, wherein said adjusting means includes a sleeve journaled in said carrier for oscillatory movement about the axis of the spirally grooved shaft, said sleeve having means for providing a journal in which said lug is adapted to turn from one groove to the other, and means on the carrier and having connection with the sleeve to turn the sleeve in one and the other direction about the axis of the spirally grooved shaft to advance and retard the lug in said grooves for adjusting the lay of the cable on the winding drum simultaneously with winding of the cable thereon, said sleeve turning means being adapted to hold the sleeve in any adjusted position thereof.

3. In an apparatus which includes a drum for winding a cable thereon, a level winding shaft having right and left grooves, means for rotating the shaft and drum in timed relation, a cable guide carrier on the shaft and carrying a lug engaging alternately the right and left grooves to reciprocate the cable guide carrier along said shaft to lay the cable on the winding drum, and adjusting means for advancing and retarding the lug within one and the other of said grooves to adjust lay of the cable on the drum while the shaft and drum are rotating and cable is being wound upon the winding drum, wherein said adjusting means includes a sleeve journaled in said carrier for oscillatory movement about the spirally grooved shaft, said sleeve having a radial opening providing a journal in which said lug is adapted to turn, a worm gear fixed to said sleeve, a worm shaft, a worm on the worm shaft meshing with the worm gear, means fixed to a part of said carrier for journaling the worm shaft, a hand wheel on said worm shaft to turn the worm in one and the other direction about the axis of the spirally grooved shaft to advance and retard the lug in said grooves to adjust the lay of the cable on the winding drum simultaneously with winding of the cable thereon.

References Cited in the file of this patent
UNITED STATES PATENTS

| | | |
|---|---|---|
| 661,019 | McConnan | Oct. 30, 1900 |
| 1,645,273 | Au | Oct. 11, 1927 |
| 1,875,467 | Knoerzer | Sept. 6, 1932 |
| 1,957,340 | Hoffner | May 1, 1934 |
| 2,441,596 | Reitter | May 18, 1948 |
| 2,714,998 | Guilbert | Aug. 9, 1955 |
| 2,874,579 | Geyer | Feb. 24, 1956 |